March 20, 1945.　　　M. SCHMIDT ET AL　　　2,371,927
NUT
Filed Nov. 19, 1938
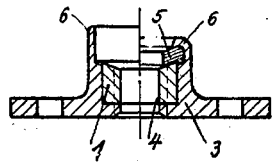
Fig.1
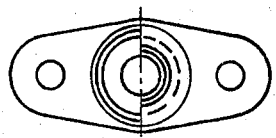
Fig.2
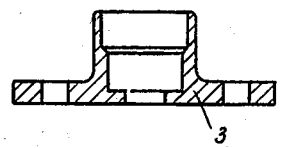
Fig.3
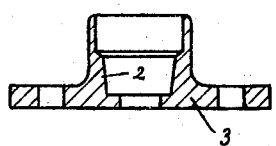
Fig.4
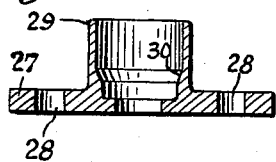
Fig.12.
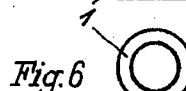
Fig.5
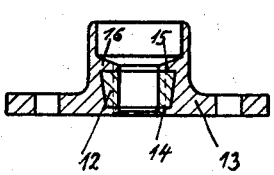
Fig.11
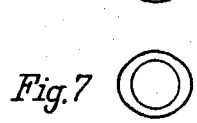
Fig.6
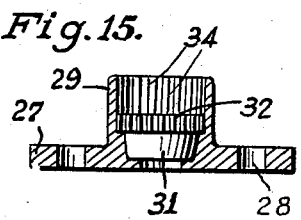
Fig.15.
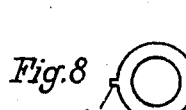
Fig.7
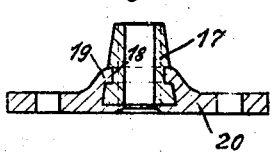
Fig.18
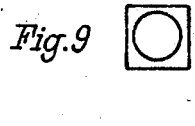
Fig.8
Fig.9
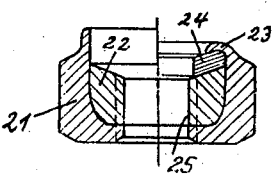
Fig.19
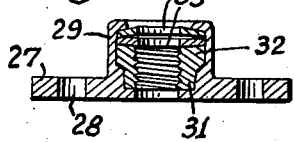
Fig.16.
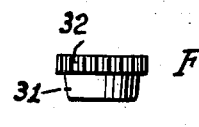
Fig.10
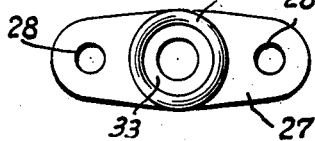
Fig.17.
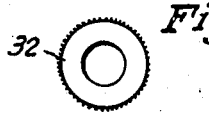
Fig.13.
Fig.14.
Inventors:
Martin Schmidt
Karl Gmöhling
by Walter S. Bleistein
ATTORNEY Patented Mar. 20, 1945

2,371,927

UNITED STATES PATENT OFFICE 2,371,927

NUT

Martin Schmidt, Weende, near Gottingen, and Karl Gmöhling, Gottingen, Germany; vested in the Alien Property Custodian Application November 19, 1938, Serial No. 241,476
In Germany January 26, 1938

11 Claims. (Cl. 151—7)

The present invention relates to nuts which as e. g., in the manufacture of aircraft, are required to be of light weight and yet to have great strength as regards their screw connection.

For this purpose it is known to use nuts of light metal of various alloys, but with such nuts it is difficult if not impossible to obtain the same strength of connection as can be achieved with steel nuts. In particular, in the case of light metal nuts the resistance of the thread convolutions against twisting forces is frequently not adequate. Also, it often happens that the first convolutions of the thread of the nut are damaged if the bolt is applied at an angle rather than in line with the nut axis, and this applies especially when steel bolts are used. Steel bolts also easily wear the light metal thread of the nut, and furthermore, the convolutions of the thread are frequently damaged or broken by constant jolting.

In order to eliminate these drawbacks, a nut according to the present invention is so constructed that its inner thread is formed wholly or partly by a bush of steel or other heavy metal, which is embedded so as to be incapable of rotation in the nut element or casing, which consists of light metal.

With a construction of this kind, the light metal nut element may have any desired shape, for example, it may be an ordinary hexagonal nut, or it may be a flanged nut to be riveted on a base. The weight of the light metal nut as a whole is only increased to an inconsiderable degree by the inserted steel threaded bush, while the strength of the thread and thus the strength of the screw connection corresponds to that of a steel nut. In addition, there results the advantage, as compared with steel nuts, of simple and cheap manufacture together with the avoidance of waste of material.

Together with the steel threaded bush, any desired locking element may be installed into the light metal nut at a suitable point, or the steel bush may be made so as to act as a locking element, e. g., by slotting. In order to prevent the steel threaded bush with certainty from being pulled out of the light metal nut element, even under high tensile strains, it is of advantage to provide a conical bearing surface for the steel insert.

Further, with the present invention, a locking of the components of the nut against any form of twisting is obtained in a manner which is very simple from the manufacturing point of view, in that the rim or the outer surface of the steel bush is provided with teeth or longitudinal ribs, of which the diameter is somewhat larger than the internal width of the cavity, which receives the bush, in the light metal nut casing. When a steel bush is inserted or pressed into the light metal nut casing, longitudinal grooves are formed on the inner wall of the cavity in the casing. These grooves protect the fibre rings, which are likewise inserted into this cavity after the bush and are clamped fast by bending the rim of the nut inwards, against rotation.

The invention is more fully described with reference to the accompanying drawing, in which—

Figures 1 to 3 show a flanged light metal nut with an inserted thread bush of heavy metal and with a locking element of resilient material.

Fig. 4 is a longitudinal section of a modified nut casing.

Figures 5 to 10 respectively, show various forms of construction of threaded bush inserts.

Fig. 11 shows a flanged light metal nut casing into which a conical heavy metal threaded bush is inserted.

Figures 12 to 17 show a further modification of the elements of a nut both separately and combined to form a nut for riveting on with a heavy metal threaded bush pressed into the casing and provided with circumferential grooves, and with locking elements of resilient material.

Fig. 18 shows another flanged light metal casing with a threaded bush, and Fig. 19 is a sectional view of a hexagonal nut of light metal with a heavy metal threaded bush and a locking ring of resilient material.

In the construction according to Figures 1 to 3, a threaded bush 1, of steel, which is grooved on its periphery in the manner shown in Figure 5, is inserted into a flanged nut casing 3 of light metal. As apparent from the drawing, the thread 4 of the complete nut consists partly of light metal, but substantially of steel. The flange of the nut casing is provided with holes through which rivets (not shown) may be passed in order to secure the nut to a base. Above the threaded bush 1, a locking ring 5 of a resilient material is embedded in the light metal nut casing whose upper rim 6 is bent over so as to hold the ring 5 in its position. As shown in Figure 4, the bearing surface 2 for the threaded bush may also be of conical construction.

The inserted threaded bush may be prevented from turning in the light metal part 3 of the nut in various ways. For example, the outer surface of the threaded bush may be grooved, as shown in Figs. 5 and 6. In the construction illustrated in Figure 7, the threaded bush is of oval shape externally, whilst in Figure 8, the threaded bush has two side lugs 26. The threaded bush may also be designed externally as a square or hexagon, as illustrated in Figures 9 and 10.

According to Figure 11, a steel threaded bush 12 may be inserted into the light metal nut 13 in such a manner that the two ends 14 and 15 of the steel threaded bush are covered by light metal. In this case, the locking ring 5 for the screw is placed upon the light metal intermediate wall 16, so that it is separated from the steel threaded bush. In this manner it is possible to protect the steel threaded bush from the admission of moisture. This form of construction is formed for instance by die or pressure casting.

In the case of nuts in which fibre rings or the like are inserted for the purpose of locking the nut against twisting, it is desirable that not only the steel bush carrying the inner thread but also the locking rings should be incapable of rotation either relatively to each other or relatively to the nut part consisting of light metal. This, however, cannot always be obtained with sufficient certainty merely by the clamping action of the inwardly bent rim of the nut on the fibre rings. With the present invention, however, an additional protection against twisting can be obtained by pressing in a steel bush of which the diameter is somewhat larger than the diameter of the bore of the nut casing. When the grooved steel bush is inserted there are formed on the inner wall of the bore longitudinal grooves which prevent rotation of the fibre rings subsequently inserted into the bore (Figures 12–17).

A particularly advantageous construction consists in that the outer surface of the steel bush is smooth-walled and slightly conical in the lower part and is toothed or provided with longitudinal ribs only in the thicker upper part, while the inner wall of the bore in the nut casing, which bore receives the bush, has an obliquely rising annular shoulder into which the longitudinal ribs or teeth of the steel bush penetrate more strongly or more deeply when being pressed in than into the upper part of the wall past which the bush is pushed when being pressed in, thus cutting longitudinal grooves. The teeth of the upper part of the bush surface thus fulfill a double purpose in that on insertion of the bush firstly there are cut longitudinal grooves which impede rotation of the locking disc, and secondly, there is obtained a firm anchoring of the steel bush itself in the light metal.

As shown in Figure 13, the steel bush carrying the internal thread consists of a lower, smooth-walled slightly conical part 31 and of a thicker upper part 32, which is toothed or provided with longitudinal ribs. When the bush is being pressed in, these longitudinal ribs cut corresponding longitudinal grooves 34 in the inner wall of the bore of the nut casing, which consists of light metal (Figure 15). In addition, the teeth penetrate particularly deeply into the light metal on the obliquely rising annular shoulder 30 of the cavity and protect the bush against twisting relative to the light metal element. However, the fibre rings 33, which are pressed in after the bush and which are clamped firm by the inwardly bent rim of the nut, are also protected against turning by the grooves cut in the inner wall when the bush is pressed in. The same form of protection against twisting as in the riveting nut provided with flanges 27 and bores 28 may obviously also be used with hexagonal nuts and the like.

We claim:

1. A nut comprising a casing of light metal having a bottom flange adapted to be riveted to an external member, an internally threaded bush of a hard metal such as steel, having a non-circular outer contour, and a resilient locking ring, the casing being originally of a width at its top so as to permit the bush to be inserted from the top and having inner faces so shaped as to tightly fit the outer faces of said bush and to form an abutment for the bush near the bottom, and the upper rim of the casing being turned inwardly upon the ring inserted in the casing on top of said bush so as to clamp said bush between said abutment and said ring.

2. A nut as claimed in claim 1, in which said casing is provided with an interiorly inclined shoulder into which the ends of said projections of the bush enter when the latter is forced into said casing.

3. A nut comprising a casing of light metal having a bottom flange adapted to be riveted to an external member, and an internally threaded bush of a hard metal such as steel, said bush having a conical outer surface tapering towards the bottom, said casing having an upper and a lower portion, said lower portion having an inner conical surface corresponding to the conical bush surface, said casing including an interior ring-shaped extension between said lower and upper portions, said extension being adapted to be forced down upon the inserted bush so as to force it into engagement with said conical surface of said lower portion, said upper portion of the casing being adapted to receive a locking ring therein, and the upper rim of said upper portion being adapted to be turned down after the bush and the locking ring are in position.

4. A nut comprising a casing of light metal including a bottom flange adapted to be riveted to an external member, an internally threaded bush of a hard metal such as steel, and a locking ring of a resilient material, said bush having longitudinal projections of its outer surface, said casing being originally of a width slightly less than the width of the bush including said projections, and having an abutment for the bush near the bottom, said bush being forcibly pressed into said casing whereby said projections of said bush cut into the material of the casing, said locking ring being arranged on top of said bush so as to engage the grooves of the interior face of the casing which grooves are cut into the casing by the projections of the bush during the inserting of the latter, and the upper rim of said casing being turned inwardly upon said ring so as to force said ring against said bush and the latter against said abutment.

5. A nut as claimed in claim 4, in which said bush includes a lower conical portion and an upper portion provided with said longitudinal projections, and in which said casing has a lower portion with an inner conical surface corresponding to the conical bush portion, and an inclined shoulder on top of said lower portion, whereby the ends of said projections of the upper bush portion cut into said shoulder when the bush is forced into said casing.

6. A self-locking nut comprising a nut body having a bore therethrough, a thread insert of harder material than that of the nut body in said bore and having a threaded bore, a portion of the surface of said insert in contact with the nut body being roughened and pressed into the softer material of the nut body to provide an irregular gripping surface between the nut body and the insert to prevent relative turning movement between the two parts, and a locking insert of elastic material fixed in said bore adjacent to said thread insert.

7. A self-locking nut comprising a metal nut body having a shouldered bore therethrough, a thread insert of harder metal than that of the nut body in said bore, said insert seating against said shoulder and having a threaded bore adapted to be engaged by the threads of a member on which the nut is screwed, and a locking insert of elastic material seated in the bore of the nut body against the end of said thread insert remote from the base of the nut, said locking insert having a bore of smaller diameter than the maximum diameter of the thread of said thread insert and adapted to have a thread formed therein by the thread of a member on which the nut is screwed, the wall of the nut body on the side of the locking insert remote from the thread insert being turned inwardly over the locking insert to clamp the same and the thread insert against axial movement in the nut body.

8. A self-locking nut comprising a nut body having a shouldered bore therethrough, a thread insert of harder material than that of the nut body, said insert having a threaded bore therethrough and a flange portion seating against the shoulder in the nut body, a portion of the peripheral surface of said insert being roughened and deforming the softer material of the nut body with which it is in contact to provide irregular contact surface for preventing turning movement of the insert in the nut body, and a locking insert of elastic material fixed in said bore adjacent to said thread insert.

9. A self-locking nut comprising a metal nut body having a bore therethrough, said bore comprising a portion of relatively small diameter in the base part of the nut body, a portion of relatively large diameter in the top part of the nut body and a shoulder between said portions, a thread insert of harder metal than that of the nut body, said insert comprising a barrel portion situated in the smaller bore portion in the nut body and a flange portion seating against said shoulder, the peripheral surface of said insert being roughened and of such diameter as to seat in the larger bore portion of the nut body by deforming the metal of the wall of said larger bore portion, and a locking insert of elastic material in said larger bore portion of the nut body, the peripheral surface of said locking insert being irregular and interfitting with the roughened surface of said larger bore portion, the wall of the nut body at one end of the bore therein being inturned over said locking insert to retain said inserts against axial movement in the nut body.

10. A self-locking nut comprising a metal nut body having a shouldered bore therethrough, a thread insert seated in said bore and having a barrel portion located in the smaller portion of said bore and a flange portion at one end of the insert seating against the shoulder of said bore, and a locking insert located in the larger portion of said bore, said locking insert seating against the flange portion of said thread insert and being clamped in the nut body between said flange portion and a portion of the nut body.

11. A self-locking nut comprising a metal nut body having a bore therethrough, said bore comprising a bore portion of relatively small diameter in the base part of the nut, a bore portion of relatively large diameter in the upper part of the nut, and a short intermediate bore portion between the aforesaid portions, the diameter of said intermediate portion at at least one point thereof being slightly smaller than the diameter of said bore portion of relatively large diameter, a thread insert of metal harder than that of the nut body, said insert having a threaded bore therethrough, a barrel portion in said bore portion of relatively small diameter, and a flange portion above said portion of relatively small diameter, said flange portion having a roughened peripheral surface of substantially the same diameter as that of said bore portion of relatively large diameter seated in the relatively soft metal of said intermediate bore portion to prevent turning of the insert in the nut body, and a locking insert of elastic material fixed in said bore portion of relatively large diameter adjacent to said thread insert.

MARTIN SCHMIDT.
KARL GMÖHLING.